US011966290B2

(12) United States Patent
Vijayaraghavan et al.

(10) Patent No.: US 11,966,290 B2
(45) Date of Patent: *Apr. 23, 2024

(54) CHECKER CORES FOR FAULT TOLERANT PROCESSING

(71) Applicant: SiFive, Inc., San Mateo, CA (US)

(72) Inventors: Murali Vijayaraghavan, San Mateo, CA (US); Krste Asanovic, Berkeley, CA (US)

(73) Assignee: SiFive, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,252

(22) Filed: Jan. 15, 2023

(65) Prior Publication Data

US 2023/0153203 A1  May 18, 2023

Related U.S. Application Data

(63) Continuation of application No. 17/115,776, filed on Dec. 8, 2020, now Pat. No. 11,556,413.
(Continued)

(51) Int. Cl.
*G06F 11/10* (2006.01)
*G06F 9/30* (2018.01)
(Continued)

(52) U.S. Cl.
CPC ...... *G06F 11/1068* (2013.01); *G06F 9/30047* (2013.01); *G06F 9/321* (2013.01);
(Continued)

(58) Field of Classification Search
CPC .. G06F 11/1068; G06F 9/30047; G06F 9/321; G06F 11/0772; G06F 11/3024;
(Continued)

(56) References Cited

U.S. PATENT DOCUMENTS

2015/0355962 A1  12/2015 Pathirane et al.
2015/0363248 A1  12/2015 D'Abreu
(Continued)

OTHER PUBLICATIONS

T. M. Austin; "DIVA: A Reliable Substrate for Deep Submicron Microarchitecture Design"; Published in the Proceedings of the 32nd International Symposium on Microarchitecture, Nov. 1999; 12 pages.
(Continued)

*Primary Examiner* — James C Kerveros
(74) *Attorney, Agent, or Firm* — Kilpatrick Townsend & Stockton LLP

(57) ABSTRACT

Systems and methods are disclosed for checker cores for fault tolerant processing. For example, an integrated circuit (e.g., a processor) for executing instructions includes a processor core configured to execute instructions of an instruction set; an outer memory system configured to store instructions and data; and a checker core configured to receive committed instruction packets from the processor core and check the committed instruction packets for errors, wherein the checker core is configured to utilize a memory pathway of the processor core to access the outer memory system by receiving instructions and data read from the outer memory system as portions of committed instruction packets from the processor core. For example, data flow from the processor core to the checker core may be limited to committed instruction packets received via dedicated a wire bundle.

20 Claims, 5 Drawing Sheets

Related U.S. Application Data

(60) Provisional application No. 62/945,879, filed on Dec. 9, 2019.

(51) Int. Cl.
    *G06F 9/32*           (2018.01)
    *G06F 11/07*         (2006.01)
    *G06F 11/30*         (2006.01)
    *G06F 12/1027*     (2016.01)

(52) U.S. Cl.
    CPC ...... *G06F 11/0772* (2013.01); *G06F 11/3024* (2013.01); *G06F 11/3037* (2013.01); *G06F 12/1027* (2013.01)

(58) Field of Classification Search
    CPC ............. G06F 11/3037; G06F 12/1027; G06F 11/165; G06F 11/1641; G06F 11/3065
    USPC ......................................................... 714/746
    See application file for complete search history.

(56) References Cited

U.S. PATENT DOCUMENTS

| | | | |
|---|---|---|---|
| 2020/0089559 A1* | 3/2020 | Ainsworth | G06F 11/1629 |
| 2020/0192742 A1* | 6/2020 | Boettcher | G06F 11/0721 |
| 2020/0192775 A1 | 6/2020 | Venu et al. | |

OTHER PUBLICATIONS

Application Note, "Cortex-M33 Dual Core Lockstep", Version 1.0; ARM Non-Confidential, 2017, Document No. ARM-ECM-0690721, pp. 1-17.

\* cited by examiner

CHECKER CORES FOR FAULT TOLERANT PROCESSING

CROSS-REFERENCE TO RELATED APPLICATION(S)

This application is a continuation of U.S. patent application Ser. No. 17/115,776, which was filed on Dec. 8, 2020, which claims priority to and the benefit of U.S. Provisional Application Patent Ser. No. 62/945,879, filed Dec. 9, 2019. The content of the foregoing applications is incorporated herein by reference in its entirety for all purposes.

TECHNICAL FIELD

This disclosure relates to checker cores for fault tolerant processing.

BACKGROUND

A Dual Core Lock-Step (DCLS) processor design helps a processing system detect logic failures. For example, aviation electronics usually have higher risk of being affected by alpha particles or cosmic rays. Failure detection and correction mechanisms are important features for high reliability in such systems. DCLS is a technique applied to the systems because for its failure detection capability. DCLS deploys two identical processor cores inside. Two cores are initialized (reset) in the same states and fed with identical inputs. As a result, identical outputs from two cores are expected to be observed. A logic failure reaching the output in one of the cores can be detected by comparing the outputs of the two cores.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
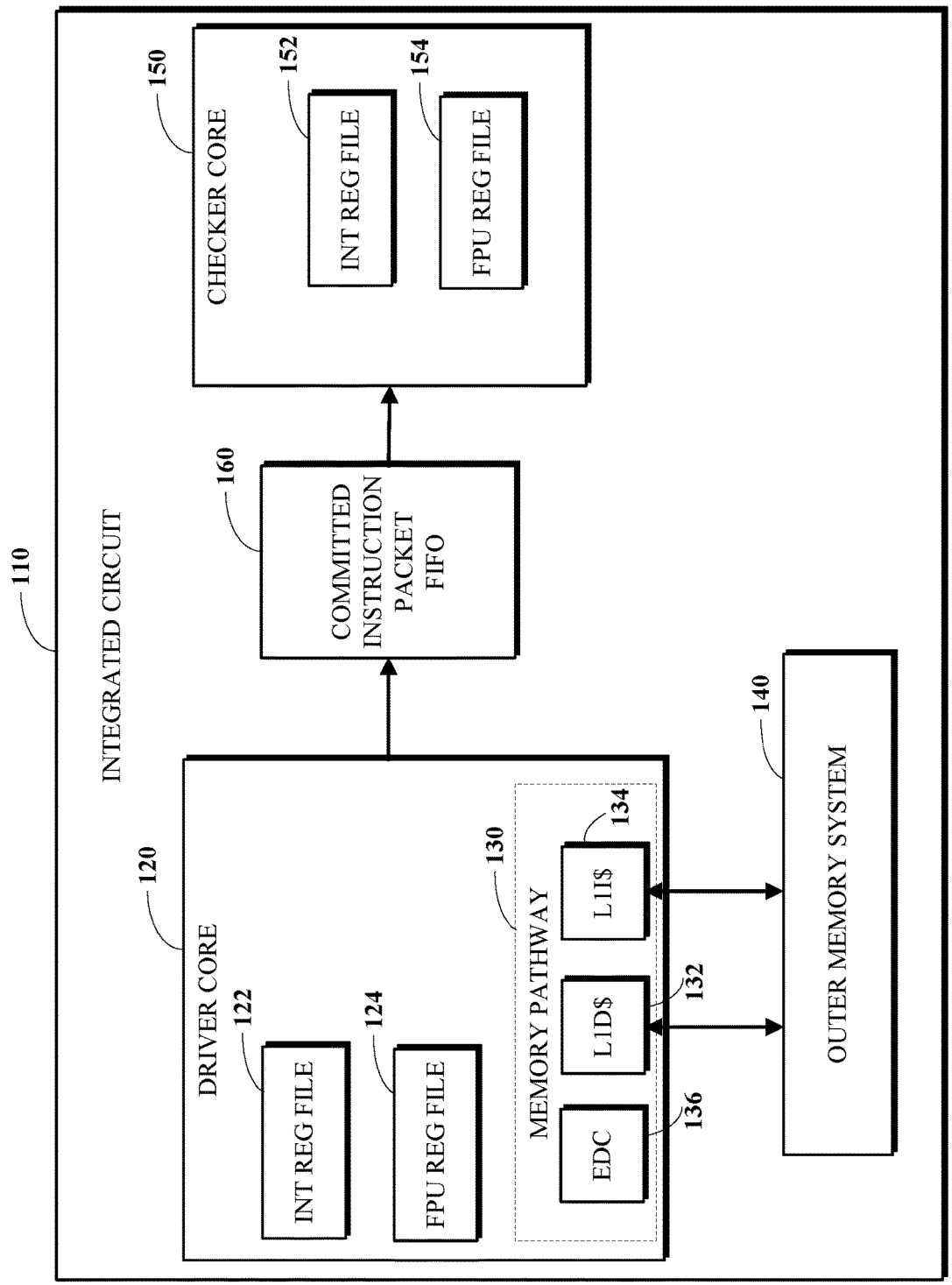
FIG. 1 is a block diagram of an example of an integrated circuit for executing instructions using a checker core.

Some high-level aspects of functional safety for data processing systems (e.g., including microprocessors or microcontrollers) may include: if there is a single (stuck-at) hardware fault, try to correct it if possible (e.g., using error correction coding (ECC), Triple Modular Redundancy (TMR), or majority voter logic); and signal an error to higher software layers to take corrective action. In some implementations, it may be acceptable to only raise errors instead of correcting faults. A higher level software system may decide how to process the error. For example, a solution may be to switch off the failing hardware block (if the power domain can be isolated) or the entire integrated circuit (e.g., at the chip level). This power down solution makes the processing system less available, but that may be acceptable in some applications with some processing system designs.

Examples of strategies for improving functional safety may include: memory components (e.g., SRAMs) may be protected using ECC; single bit errors may be corrected in memory components (e.g., SRAMs); and Dual Core Lock Step (DCLS) execution may be employed to execute the same program in two cores, and flag an error if the results do not match in the two cores.

Some advantages over the conventional DCLS approach may be achieved by not using two identical cores to check for errors. A hardware fault can be a systematic fault that manifests itself because of: temporal locality, where a fault occurs at a certain time instance in every component (e.g., a clock glitch that affects every component); spatial locality, where a fault occurs at a particular chip or component (e.g., a specific component has a physical damage or an alpha particle bombardment); or design locality, where a fault always occurs in a particular design (e.g., a specific register-transfer logic (RTL) design has a systematic functional bug).

Various types of diversity may be used to mitigate the three kinds of faults. Temporal diversity, where two cores must execute with some temporal offset may be used to mitigate faults with temporal locality. For example, one core of a pair may execute instructions behind the other core by at least t clock cycles (e.g., at a lag of 1, 2, or 3 clock cycles). Spatial diversity, where the two cores are positioned as far apart as feasible within an integrated circuit (e.g., a microprocessor chip), may be used to mitigate faults with spatial locality. Design diversity, where the two cores differ in their implementation of an instruction set, may be used to detect or prevent systematic errors during design. Using two cores that are not identical may provide the design diversity to mitigate design related errors. For example, design diversity may be particularly useful when one of the processing cores implements a complex microarchitecture that cannot be formerly verified can be paired with a simpler core supporting the same instruction set that can be formerly verified (e.g., using Kami verification). Traditional DCLS uses identical cores, thereby failing to achieve design diversity. Using different technologies for the two cores that have the same RTL may achieve some design diversity.

Traditionally, DCLS involves two cores which are cycle-accurate with respect to each other. However, functional safety goals for a processing system may be achieved by using two cores are identical only with respect to committed instructions. In some implementations, substantial gains in functional safety may be achieved by using two substantially different cores and check only that the committed instructions are matching. This approach may be referred to as Dual Core Instruction Lock-Step (DCILS).

Some implementations of DCILS use one high-performance "driver" core, and one relatively simple "checker" core. An advantage of this approach is that existing high-performance cores may be used as driver core with little or no modifications in DCILS designed integrated circuit. In some implementations, the checker core is formally verified (e.g., using Kami).

Some implementations of DCILS may present issues, such as: if two different cores are used, the overall throughput may be limited by the slower core; and there is a question of how much information should be compared between the cores to declare them to be in agreement or not, in order to detect an acceptable set of potential errors for achieving functional safety goals. Therefore, it may be advantageous to design the checker core to strictly keep pace with the driver core, so as not to slow down processing by the DCILS system relative to the driver core operating in isolation. For example, the checker core may rely on the memory pathway (e.g., including an instruction cache, a data cache, and associated logic) of the driver core to access instructions and data in an outer memory system and assume that memory pathway is operating correctly to avoid potential delays that could be introduced by the checker core attempting to access the outer memory system independently from the driver core. For example, a checker core may receive instructions and data loaded from outer memory from the driver core as portions of committed instruction packets that include all information the checker core needs from the driver core to update its instruction architectural state for the committed instruction and check the operation of the driver core for that committed instruction. For example, alternate mechanisms may be employed to detect and/or correct errors in the memory pathway (e.g., ECC or parity checks may be built into the memory pathway).

Formal verification of checker core (e.g., using Kami) may be performed for sufficiently simple checker core designs to realize a number of advantages. For example, formal verification of a checker core may enable detection of errors in the driver core during operation, even if the driver core, which is not formally verified, turns out to be functionally incorrect. In some implementations, the driver core may be modified to inject "correct" state from the formally verified core whenever such an error occurs, which may enable error recovery, both for functional safety and/or functional correctness. Formal verification of the checker core may also enable a verification team to run RTL of the formally verified checker core in tandem with the RTL of the driver core to achieve better pre-silicon functional verification coverage.

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

Details

FIG. 1 is a block diagram of an example of an integrated circuit 110 for executing instructions using a checker core 150. The integrated circuit 110 (e.g., a microprocessor or a microcontroller) includes a driver core configured to execute instructions of an instruction set; an outer memory system 140 configured to store instructions and data; a checker core 150 configured to receive committed instruction packets from the processor core and check the committed instruction packets for errors; and a first-in-first-out buffer 160 configured store committed instruction packets received from the processor core and accessed by the checker core. For example, the integrated circuit 110 may utilize a dual core instruction lock step technique (DCILS) to execute instructions with the driver core 120 and the checker core 150 to detect errors of various types and achieve greater functional safety.

The driver core 120 may be any type of processor core, such as a high-performance processor core. For example, the driver core 120 may be superscalar, out of order, with a multi-stage pipeline (e.g., a 6, 8, or 10 stage pipeline). For example, the driver core 120 may be configured to execute instructions of a RISC-V instruction set.

The driver core 120 includes registers, including registers of integer register file 122 and a floating point unit (FPU) register file 124. The driver core 120 also includes a memory pathway 130 that enables the driver core 120 to access instructions and data stored in the outer memory system 140. In this example, the memory pathway 130 includes an L1 data cache 132 and an L1 instruction cache 134 and associated memory management logic to increase the efficiency memory operations acting on the outer memory system 140. In some implementations, the driver core 120 uses physical addresses. In some implementations, the driver core 120 uses virtual addresses and the memory pathway 130 may include one or more translation lookaside buffers (TLBs). The driver core 120 may use the memory pathway 130 to load instructions and data from the outer memory system 140. The driver core 120 may use the memory pathway 130 to store data in the outer memory system 140.

The checker core 150 is configured to receive committed instruction packets from the driver core 120 (e.g., via the FIFO buffer 160) and check the committed instruction packets for errors. In some implementations, the checker may be significantly less complex than the driver core. For example, the checker core 150 may lack feedback mechanisms in its pipeline, since the sequence of instructions to execute is determined by the driver core 120 and dictated via the sequence of committed instruction packets transferred between the two cores. For example, the checker core 150 may implement no branch prediction, and may assume instructions in the committed instruction packets are correctly fetched. For example, the checker core 150 may include an arithmetic logic unit (ALU), a floating point unit (FPU), and/or control & status registers (CSR) that are needed to execute instructions of the instruction set (e.g., a RISC-V instruction set) shared by the driver core 120 and the checker core 150. The checker core 150 includes an integer register file 152 and a floating point unit register file 154, which may store, in whole or in part, an architectural state of the checker core 150, which should match the architectural state of the driver core 120 after each committed instruction in the absence of errors. The checker core 150 may be configured to utilize the memory pathway 130 of the driver core 120 to access the outer memory system 140 by receiving instructions and data read from the outer memory system 140 as portions of committed instruction packets from the driver core 150. Thus, the checker core, by assuming the memory pathway 130 of the driver core 120 is operating properly and relying on the instructions and data retrieved using this memory pathway 130 can avoid using an independent memory pathway to access the outer memory 140. For example, the checker core 150 may lack access to the outer memory system 140 that is independent of the driver core 120. This configuration avoids the potential for delays associated with the checker core 150 attempting to independently access the outer memory system 140, which could slow down the pair of cores 120 and 150.

Relying on the same memory pathway 130, creates a vulnerability to errors in the memory pathway 130. Additional measures may be implemented to mitigate the risk of errors in the memory pathway 130. In some implementations, an error detection circuit 136 is included in the memory pathway 130 of the driver core 120 that is configured to detect errors in data passing through the memory pathway 130. For example, the error detection circuit 136 may implement a parity check. For example, the error detection circuit 136 may implement an error correcting code (ECC) that corrects detected errors. In some implementations, the error detection circuit 136 checks entries in a cache (e.g., the L1 data cache 132 or the L1 instruction cache 134) of the memory pathway 130. In some implementations, the error detection circuit 136 is configured to check one or more registers in the memory pathway 130 storing status of a memory reservation. In some implementations, the error detection circuit 136 is configured to check one or more registers storing status of an interrupt identifier. In some implementations, the error detection circuit 136 is configured to check one or more registers of a translation lookaside buffer. In some implementations, the error detection circuit 136 is configured to check one or more registers storing a program counter. In some implementations, the error detection circuit 136 is configured to check one or more registers storing a memory address (e.g., a virtual address or a physical address).

In some implementations, the checker core 150 is positioned relatively far from the driver core 120 within the integrated circuit 110 to achieve spatial diversity in order to better reject errors with spatial locality. For example, data flow from the driver core 120 to the checker core 150 may be limited to committed instruction packets received via a dedicated wire bundle (e.g., a wire bundle that connects to the FIFO buffer 160 or directly to the driver core 120). Limiting the connections between the two cores may facilitate layouts that of the integrated circuit that position the checker core 150 far from the driver core 120. For example, a distance between the driver core 120 and the checker core 150 may be greater than a width of a footprint of the checker core 150.

The checker core 150 may be configured to achieve temporal diversity with the driver core. For example, the checker core 150 may be configured to commit instructions a fixed number of clock cycles (e.g., 1, 2, or 3 clock cycles) after the driver core 120 has committed the same instructions.

In some implementations, the checker core is formally verified and the processor core is not formally verified. This technique may impart some of the benefits of formal verification to the driver core 120, which may itself be too complex for formal verification. Note that, although not shown in FIG. 1, the integrated circuit 110 may include additional processing cores, which may include additional DCILS pairs of cores.

Figure 2:
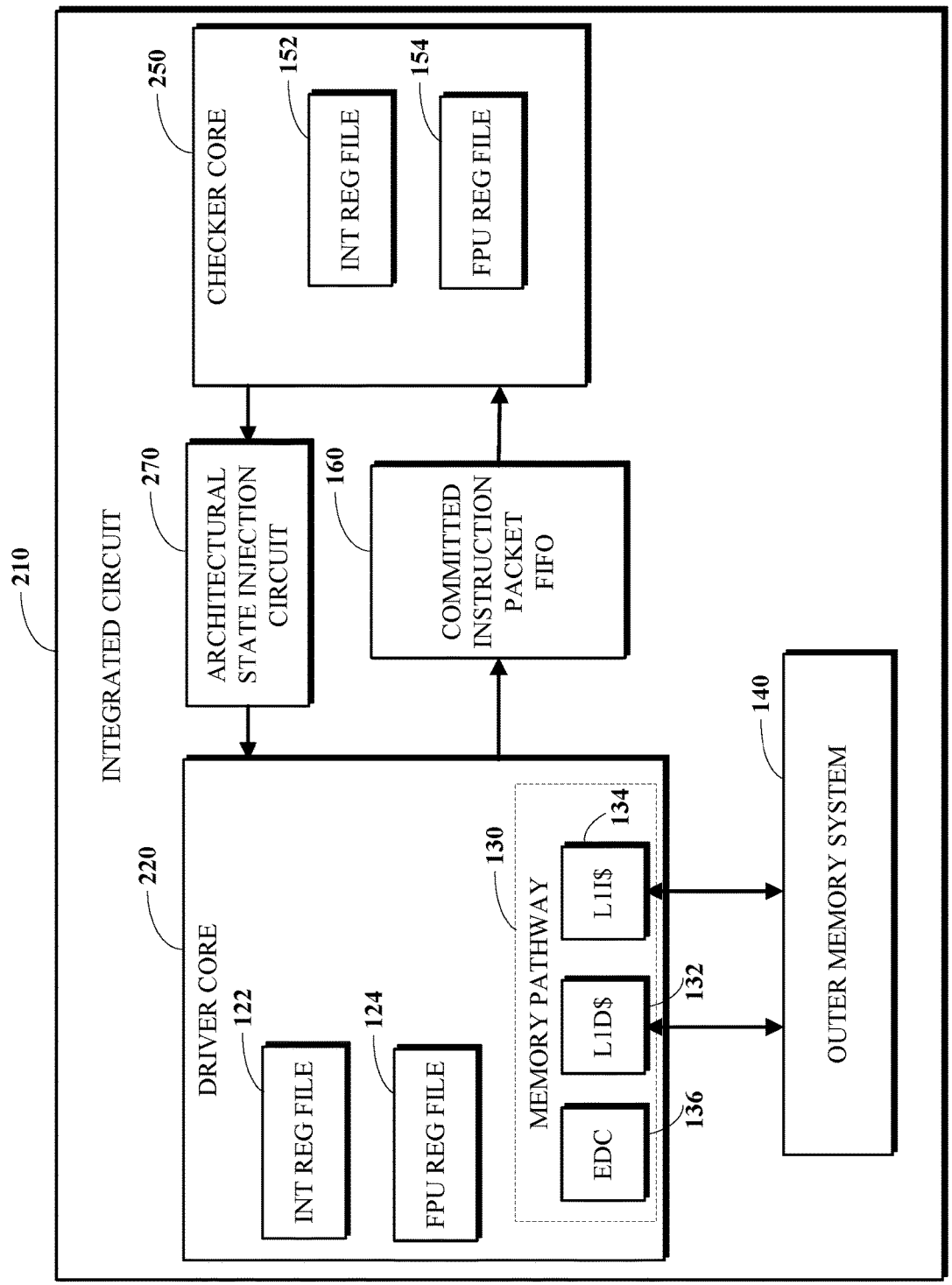
FIG. 2 is a block diagram of an example of an integrated circuit for executing instructions using a checker core with architectural state injection from the checker core to a driver core.

FIG. 2 is a block diagram of an example of an integrated circuit 210 for executing instructions using a checker core 250 with architectural state injection from the checker core 250 to a driver core 220. The integrated circuit 210 is similar to the integrated circuit 110 of FIG. 1, but includes an architectural state injection circuit 270 configured to, responsive to detection of an error in a committed instruction packet from the driver core 220 by the checker core 250, invoke a pipeline flush in the driver core 220 and copy a corrected portion of an architectural state from the checker core 250 to the driver core 220. The integrated circuit 210 may be used to correct errors occurring in the driver core 210 during processing, including both transient errors and design related errors. This technique may be particularly effective where the checker core 250 has been formally verified (e.g., using Kami).

FIG. 1 may depict an example of a DCILS technique applied to an integrated circuit (e.g., a chip) of a data processing system. A driver core 120 (e.g., a potentially high-performance processor core) is connected, via a first-in-first-out (FIFO) buffer (committed instruction packet FIFO 160), to a checker core 150. The checker core 150 may maintain its own program counter and other architectural register states (e.g., an integer register file 152, a floating point register file 154, and/or a vector register file) but may not communicate independently with an outer memory system 140 (e.g., including translation lookaside buffers, hierarchical caches, and memories). Note that in the following, the driver core 120 could be any processor core to be used for executing instructions of a supported instruction architecture (e.g., a RISC-V architecture). The driver core could be a high-performance core, but it need not be a high-performance core.

Every time the driver core 120 commits an instruction, it sends a packet corresponding to the committed instruction to the FIFO buffer 160. The committed instruction packet contains data related to a committed instruction that characterizes its impact on the architectural state of the driver core and includes input data retrieved from the outer memory system 140 by the driver core in order to execute the committed instruction, including the instruction itself. For example, a committed instruction packet may include the following information: (1) PC (program counter) of the instruction being committed; (2) Instruction; (3) For each register that is being updated by the instruction, the names and updated values of these registers—this information can be encoded in any manner; (4) If the instruction performs a memory operation, and if so, which operation (e.g., load, store, load-reserve (LR), store-conditional (SC), AMO-swap, AMO-add, etc.); (5) If the instruction performs a memory operation, the (virtual) address of the memory operation; (6) If the instruction performs a read from memory, the value it obtains from memory; (7) If the instruction performs a write to memory, the value it writes to memory; (8) In case of SC, whether the SC write succeeded in memory (this encapsulates whether the reservation corresponding to the SC address has been held or not); and (9) If the (high-performance) processor is taking an interrupt after this instruction.

The checker core 150 may assume the correctness of those values in the packet of the FIFO that are supplied by the outer memory system 140 to the driver core 120, such as: (1) The instruction corresponds to the PC. This in turn assumes that the address translation for the virtual PC is correct (if the processor performs address translation). (2) The value obtained from memory for the translated address is correct. (3) In case of a memory read operation, the value read corresponds to the (virtual) memory address. This in turn assumes that the address translation for the virtual memory address is correct (if the processor performs address translation). (3) The value obtained from memory for the translated address is correct. (4), in case of SC, the information about whether the reservation was held is correct. And (5), in case the high-performance processor takes an interrupt, the corresponding interrupt has the highest priority among enabled and pending interrupts.

Once the checker core 150 obtains the packet from the FIFO buffer 160, the checker core 150 may perform the following actions: (1) The incoming PC should match the checker core's PC—otherwise it flags an error. (2) The instruction is decoded. (3) The source registers corresponding to the instruction are read. (4) The (virtual) memory address in case the decoded instruction turns out to be a memory operation, along with the type of the memory operation is computed. This memory operation and address should match that of the incoming packet from the FIFO buffer, otherwise it flags an error. (5) In case of a memory operation that writes to memory, the value to be written to memory is computed. This should match the corresponding value in the incoming packet, otherwise it flags an error. (6) The names and values of each of the registers that are updated by the instruction is computed. This should match the corresponding values in the incoming packet, otherwise it flags an error.

The checker core 150 can also be deeply pipelined. In some implementations, the checker core 150 does not have any feedback—the instruction is fed in from the FIFO buffer 150. So, the checker core 150 can be made as fast as the driver core 120, because the clock frequency of the checker core 150 can be increased by simply adding more pipeline stages and the checker core 150 may this have a throughput of 1 or more instructions per cycle depending on the number of entries it dequeues from the FIFO buffer 160 in 1 clock cycle.

If an error is flagged by the checker core 150, it implies that there is some transient error or some logical error in either the driver core 120, the FIFO buffer 160 or the checker core 150. If the checker core 150 and FIFO buffer 160 are formally verified, logical errors can no longer occur in these two places; but the checker core 150 or FIFO buffer 160 can still have transient errors (e.g., due to alpha particle bombardment).

Note that if the assumptions (about the input to the driver core 120) are true, then if the checker core 150 does not flag any error, the only way an error can go undetected is if there are two faults—one in the driver core 120, and one in the checker core 150, such that these two faults both produce the same effect in the execution of an instruction. This is highly unlikely since the checker core 150 and the driver core 120 have different microarchitectures (design diversity). This scenario requires the effects of two orthogonal errors on two different microarchitectures being the same on an instruction's execution.

Corrective Action: An error flagged by the checker core 150 may be routed to the appropriate interrupt handler to raise a system failure interrupt and corrective actions can be taken by the external system. Corrective actions can vary ranging from shutting down the two cores and restarting, or by just re-executing the faulting instruction in the driver core. In some implementations (e.g., as shown in the example of FIG. 2), a more advanced corrective action could inject the architectural state (e.g., state of all the register files, PC, etc.) of the checker core 250 into the driver core 220 and execute the driver core 220 starting from the instruction after the one that caused the fault.

Advanced DCILS Techniques: While the baseline DCLIS techniques described above eliminate some kinds of errors, they may still miss errors that happen in the inputs to the driver core 120. That is, the assumptions that the checker core 150 makes can fail. To increase the confidence of the assumptions, the following extra precautions may be taken: (1) All memories and caches must be ECC/parity protected—to avoid storing the wrong information. The registers (and wires) storing the instruction bit-vector are ECC/parity protected starting from the memory subsystem read till the decode stage. Beyond the decode stage, the registers (or wires) carrying the instruction bit-vector need not be ECC/parity protected. (2) Similarly, the registers (and wires) storing the value read from the memory or storing the status of the reservation (in case of an SC instruction) may be ECC/parity protected starting from the memory subsystem read till the writeback stage which computes the new values written to registers. Beyond this stage, the registers (or wires) need not be ECC/parity protected. (3) The interrupt ID and the interrupt pending signals may be together ECC/parity protected. (4) In case the driver core 120 supports address translation, the TLBs may be ECC/parity protected. (5) The registers (and wires) that store the PC may be parity protected till the PC reaches the TLB (in case of address translation) or the memory subsystem. The registers (and wires) that store the memory address for an instruction that performs a memory access may also be ECC/parity protected till the address reaches the TLB or the memory subsystem. (6) In case of the presence of TLB, the registers (and wires) that stores the address during a page table walk may also be ECC/parity protected till the address reaches the memory subsystem. (7) The registers (and wires) that store the translated address from the TLB (for both PC and data memory address) may be ECC/parity protected till the address reaches the memory subsystem.

Any ECC/parity check failure in the design above may be flagged as the same type of error as flagged by the checker core 150. Employing these advanced techniques further decreases the probability of having errors go undetected (if only parity is used) or uncorrected (if ECC is used). One can still have errors that go undetected (for instance, multiple bit flips that does not trigger a parity error), but these scenarios are unlikely. Any subset of these advanced techniques can be employed depending on the fault detection/correction that is deemed necessary for a particular application.

In some implementations modified DCILS techniques are used. Instead of a FIFO buffer in between a driver core and a checker core, one can have a full-fledged reorder buffer. This avoids points (1) and (2) of the Advanced DCILS technique. Instead, every memory response goes directly into the reorder buffer in between the two cores, the reorder buffer itself may be ECC/parity protected, and the driver core has to kill and commit instructions in the reorder buffer in between the two cores (in addition to its own reorder buffer, if present).

There is a trade-off between the advanced DCILS techniques and these modified DCILS techniques. On one hand, ECC/parity protection has to be done on portions of the driver core. On the other hand, ECC/parity protection on the reorder buffer (in between the two cores) and the driver core has to explicitly kill and commit instructions on the reorder buffer (in between the two cores).

Scenarios where DCILS can be useful: If the driver core is not formally proven to be correct, the checker core's correctness may be formally proven (since it may be a much simpler core). Therefore, with minimal area overhead brought about by the additional FIFO queue and checker core, one can reap the benefits of formal verification while still experiencing the high-performance of a complex unverified driver core, especially if the checker core injects the correct architectural state into the driver core when an error is detected. If there are transient faults, since the checker core can detect any faults that occur in an instruction's execution in the driver core, it can detect transient faults as well.

Overall, DCILS may be useful for designing high-assurance mission critical systems, where it is paramount that failures are detected and potentially corrected, resulting in enhanced functional safety.

Note that the DCILS technique may be completely independent of the corrective action taken when a fault is detected.

Figure 4:
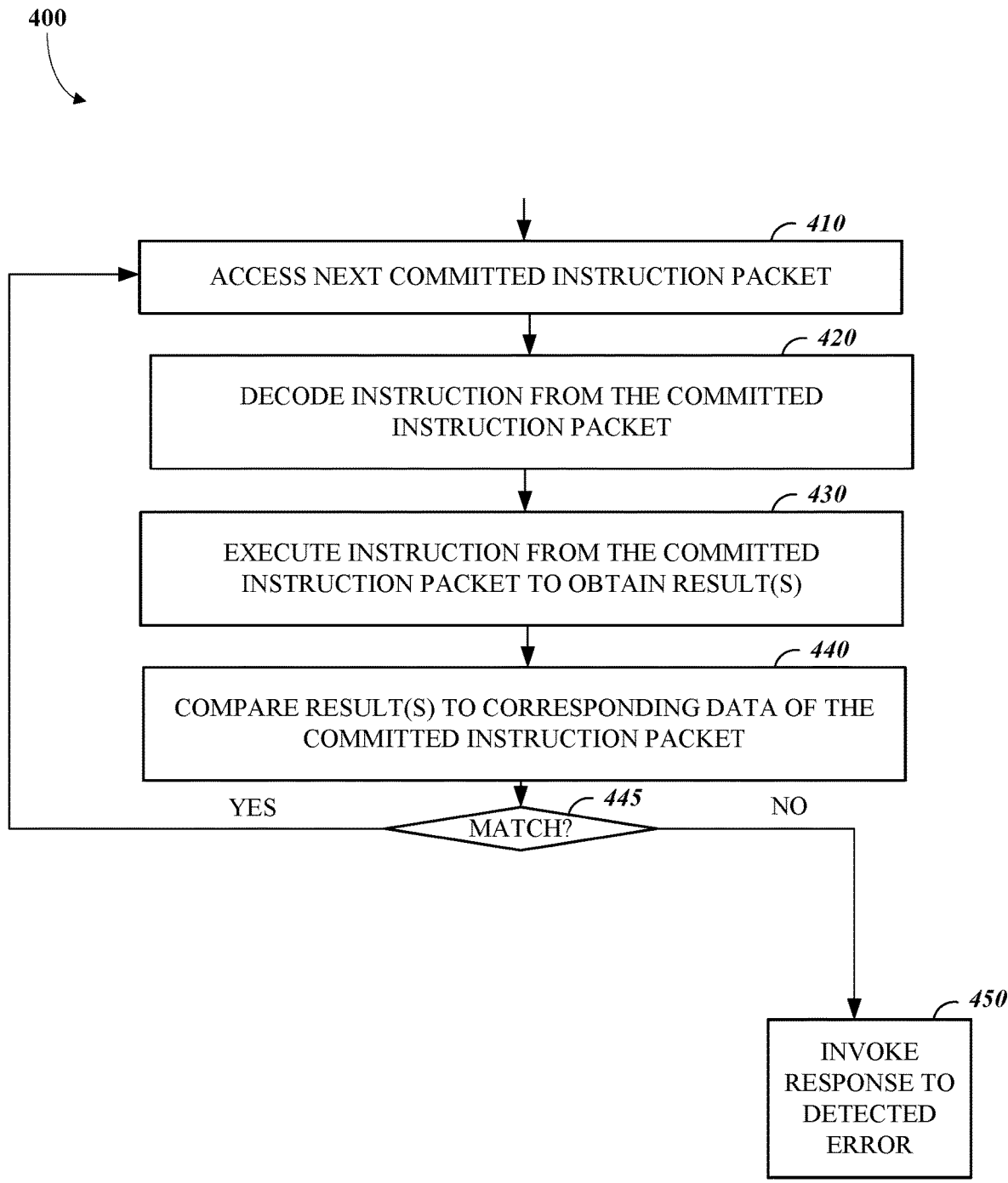
FIG. 4 is a flow chart of an example of a process for checking the execution of instructions by a processor core using a checker core to detect error conditions.

FIG. 4 is a flow chart of an example of a process 400 for checking the execution of instructions by a processor core using a checker core to detect error conditions. The process 400 includes accessing 410, using a checker core, a committed instruction packet output from a processor core; decoding 420, using the checker core, an instruction from the committed instruction packet; executing 430, using the checker core, the instruction to obtain one or more results; comparing 440, using the checker core, the one or more results to corresponding data of the committed instruction packet; and, responsive to a mismatch (at step 445) between the one or more results and the corresponding data of the committed instruction packet, invoking 450 a response to a detected error. For example, the process 400 may be implemented using the integrated circuit 110 of FIG. 1. For example, the process 400 may be implemented using the integrated circuit 210 of FIG. 2.

Figure 3:
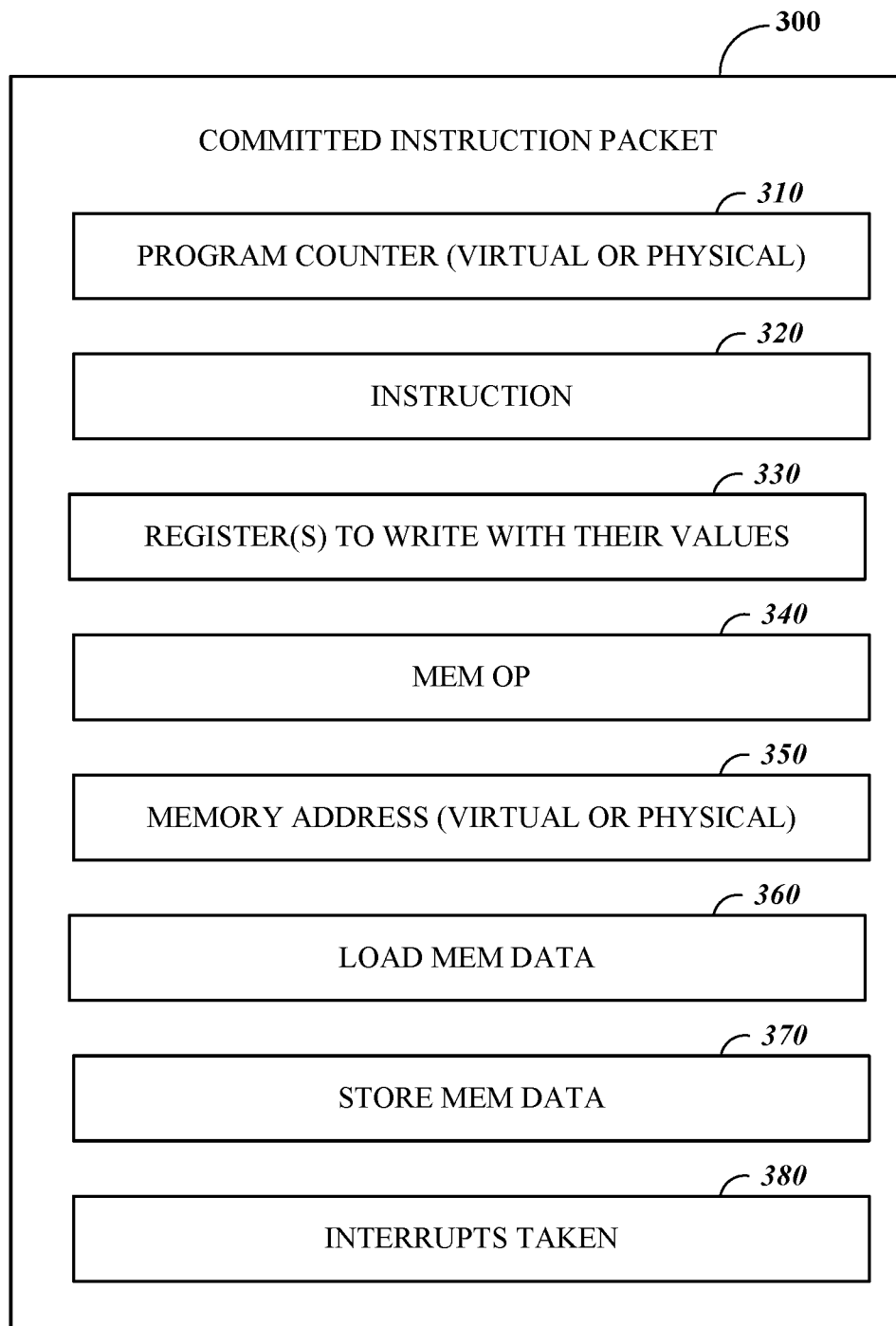
FIG. 3 is a diagram of an example of a committed instruction packet transferred from a driver core to a checker core.

The process 400 includes accessing 410, using a checker core, a committed instruction packet (e.g., the committed instruction packet 300 of FIG. 3) output from a processor core, wherein the committed instruction packet includes an instruction (e.g., the instruction 320) that has been read from an outer memory system (e.g., the outer memory system 140) and committed by the processor core (e.g., the driver core 120 or the driver core 220). For example, the committed instruction packet may be accessed 410 by reading from a committed instruction packet first-in-first-out (FIFO) buffer (e.g., the FIFO buffer 160), which connects checker core to the processor core. For example, the committed instruction packet may be accessed via a bundle of wires that connects the checker core to a committed instruction packet FIFO buffer or connects the checker core directly to the processor core.

The process 400 includes decoding 420, using the checker core, the instruction from the committed instruction packet.

The process 400 includes executing 430, using the checker core, the instruction to obtain one or more results. In some cases (e.g., when executing a load instruction), executing 430 the instruction to obtain the one or more results may include using a portion (e.g., the load memory data 360 of FIG. 3) of the committed instruction packet corresponding to data that has been read from the outer memory system by the processor core. The checker core may assume that this data received in the committed instruction packet is correct and update the architectural state of the checker core (e.g., an architectural register) based on this data. For example, the one or more results include a virtual memory address to be accessed. For example, the one or more results may include a value to be written to the outer memory system. For example, the one or more results may include a name and value of an architectural register (e.g., a register stored in the integer register file 152 or the floating point unit register file 154) to be updated.

The process 400 includes comparing 440, using the checker core, the one or more results to corresponding data of the committed instruction packet. For example, a virtual memory address to be accessed of the one or more results may be compared 440 to a virtual memory address (e.g., the memory address 350) of the committed instruction packet. In some implementations, the processor core and the checker core use physical addresses that may be compared 440 in a similar fashion. For example, a value to be written to the outer memory system of the one or more results may be compared 440 to a value (e.g., the store memory data 370) of the committed instruction packet. For example, a name and value of an architectural register of the one or more results may be compared 440 to a corresponding name a value (e.g., the one or more registers to write and their values 330) of the committed instruction packet.

If (at step 445) all of the results compared 440 to corresponding data of the committed instruction packet match, then, responsive to the match, the process 400 repeats by accessing 410 a next committed instruction packet.

If (at step 445) a result compared 440 to corresponding data of the committed instruction packet does not match, then the process 400 includes, responsive to the mismatch between the one or more results and the corresponding data of the committed instruction packet, invoking 450 a response to a detected error. For example, invoking 450 the response may include injecting an architectural state of the checker core into the processor core (e.g., using the architectural state injection service 270). In some implementations, injecting an architectural state of the checker core into the processor core includes invoking a pipeline flush in the processor core and copying a corrected portion of the architectural state from the checker core to the processor core. For example, invoking 450 the response may include sending an error message from the checker core to an interrupt handler to invoke an interrupt. For example, invoking 450 the response may include shutting down the processor core and the checker core.

It should be noted that one or more steps of the process 400 may be added to the process 500, such as comparing a program counter (e.g., the program counter 310) from the committed instruction packet to the program counter of the checker core. An error condition may be detected if there is a mismatch between the two program counters and a response to the detected error may be invoked 450.

Figure 5:
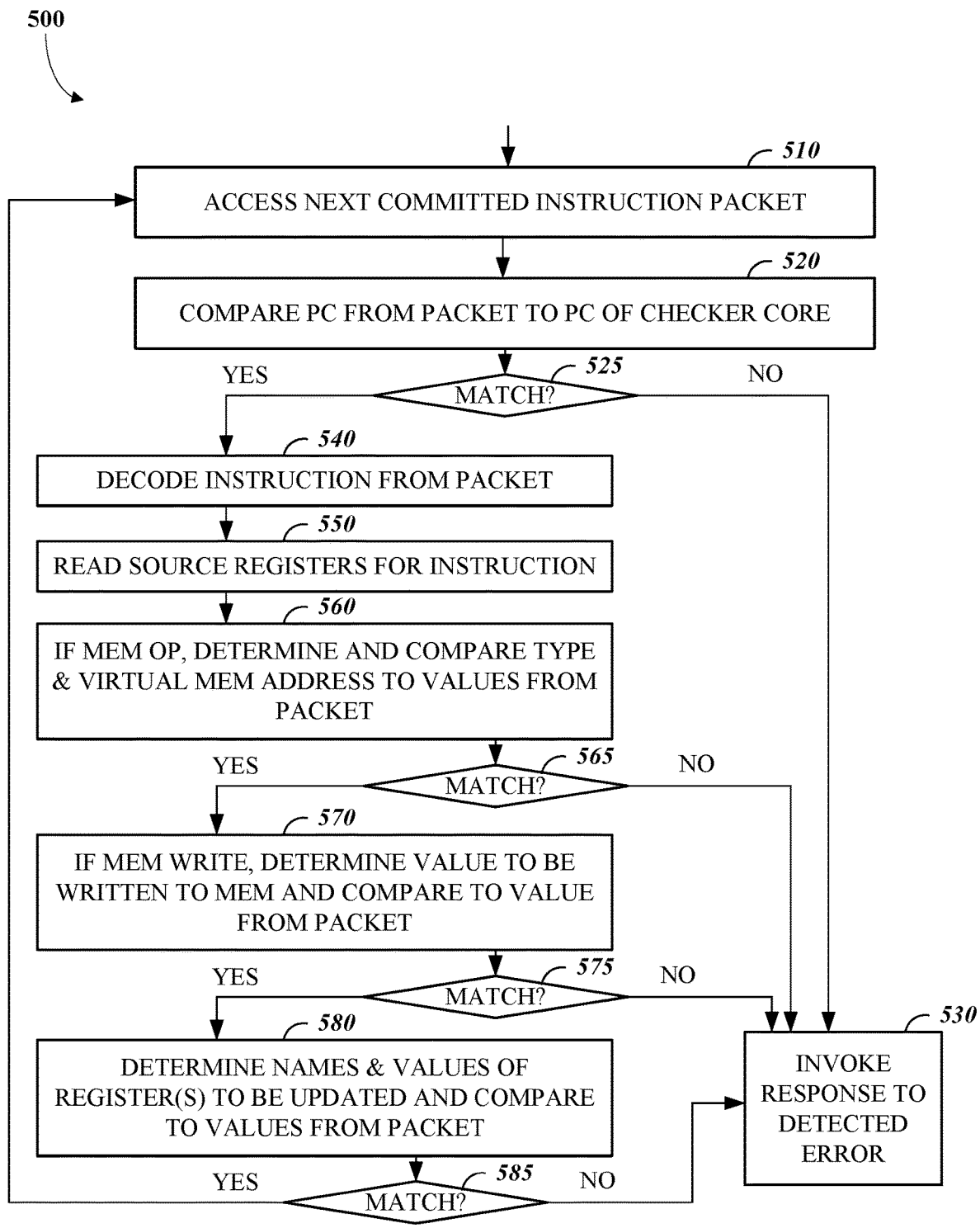
FIG. 5 is a flow chart of an example of a process for checking the execution of instructions by a processor core using a checker core to detect error conditions.

FIG. 5 is a flow chart of an example of a process 500 for checking the execution of instructions by a processor core using a checker core to detect error conditions. The process 500 includes accessing 510, using a checker core, a committed instruction packet output from a processor core; comparing 520 a program counter from the committed instruction packet to a program counter of the checker core; if (at step 525) there is mismatch invoking 530 a response to the detected error, and otherwise; decoding 540, using the checker core, an instruction from the committed instruction packet; reading 550, using the checker core, any source registers whose values are needed for execution of the decoded 540 instruction; if the decoded instruction is a memory operation, determining and comparing 560, using the checker core, a memory operation type and a virtual memory address to corresponding data of the committed instruction packet; responsive to a mismatch (at step 565), invoking 530 a response to a detected error, and otherwise; if the decoded instruction includes a memory write, determining and comparing 570 a value to be written to memory to a corresponding value from the committed instruction packet; responsive to a mismatch (at step 575), invoking 530 a response to a detected error, and otherwise; determining and comparing 580 names and values of one or more registers to be updated to corresponding values from the committed instruction packet; responsive to a mismatch (at step 585), invoking 530 a response to a detected error, and otherwise; repeating the process 500 by accessing 510 a next committed instruction packet. For example, the process 500 may be implemented using the integrated circuit 110 of FIG. 1. For example, the process 500 may be implemented using the integrated circuit 210 of FIG. 2.

In a first aspect, the subject matter described in this specification can be embodied in an integrated circuit for executing instructions that includes a processor core configured to execute instructions of an instruction set; an outer memory system configured to store instructions and data; and a checker core configured to receive committed instruction packets from the processor core and check the committed instruction packets for errors, wherein the checker core is configured to utilize a memory pathway of the processor core to access the outer memory system by receiving instructions and data read from the outer memory system as portions of committed instruction packets from the processor core. The integrated circuit may include an error detection circuit in a memory pathway of the processor core that is configured to detect errors in data passing through the memory pathway. For example, the error detection circuit may implement a parity check. For example, the error detection circuit may implement an error correcting code that corrects detected errors. For example, the error detection circuit may check entries in a cache of the memory pathway. For example, the error detection circuit may be configured to check one or more registers in the memory pathway storing status of a memory reservation. For example, the error detection circuit may be configured to check one or more registers storing status an interrupt identifier. For example, the error detection circuit may be configured to check one or more registers of a translation lookaside buffer. For example, the error detection circuit may be configured to check one or more registers storing a program counter. For example, the error detection circuit may be configured to check one or more registers of a storing a memory address. The integrated circuit may include a first-in-first-out buffer configured store committed instruction packets received from the processor core and accessed by the checker core. The integrated circuit may include an architectural state injection circuit configured to, responsive to detection of an error in a committed instruction packet from the processor core by the checker core, invoke a pipeline flush in the processor core and copy a corrected portion of an architectural state from the checker core to the processor core. For example, the checker core lacks access to the outer memory system that is independent of the processor core. In some implementations, data flow from the processor core to the checker core is limited to committed instruction packets received via a dedicated wire bundle. In some implementations, a distance between the processor core and the checker core is greater than a width of a footprint of the checker core. In some implementations, the checker core is formally verified and the processor core is not formally verified. For example, the checker core is configured to commit instructions a fixed number of clock cycles after the processor core has committed the same instructions.

In a second aspect, the subject matter described in this specification can be embodied in methods that include accessing, using a checker core, a committed instruction packet output from a processor core, wherein the committed instruction packet includes an instruction that has been read from an outer memory system and committed by the processor core; decoding, using the checker core, the instruction from the committed instruction packet; executing, using the checker core, the instruction to obtain one or more results; comparing, using the checker core, the one or more results to corresponding data of the committed instruction packet; and, responsive to a mismatch between the one or more results and the corresponding data of the committed instruction packet, invoking a response to a detected error. For example, invoking the response may include injecting an architectural state of the checker core into the processor core. In some implementations, injecting an architectural state of the checker core into the processor core comprises invoking a pipeline flush in the processor core and copying a corrected portion of the architectural state from the checker core to the processor core. For example, invoking the response may include sending an error message from the checker core to an interrupt handler to invoke an interrupt. For example, invoking the response may include shutting down the processor core and the checker core. In some implementations, executing the instruction to obtain the one or more results includes using a portion of the committed instruction packet corresponding to data that has been read from the outer memory system by the processor core. In some implementations, the methods include comparing a program counter from the committed instruction packet to the program counter of the checker core. For example, the one or more results may include a virtual memory address to be accessed. For example, the one or more results may include a value to be written to the outer memory system. For example, the one or more results may include a name and value of an architectural register to be updated.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit for executing instructions comprising:
   a processor core configured to execute instructions of an instruction set;
   an outer memory system configured to store instructions and data;
   a checker core configured to receive committed instruction packets from the processor core and check the committed instruction packets for errors, wherein the checker core is configured to utilize a memory pathway of the processor core to access the outer memory system by receiving instructions and data read from the outer memory system as portions of committed instruction packets from the processor core; and
   an architectural state injection circuit configured to, responsive to detection of an error in a committed instruction packet from the processor core by the checker core, invoke a pipeline flush in the processor core and copy a corrected portion of an architectural state from the checker core to the processor core.

2. The integrated circuit of claim 1, comprising:
   an error detection circuit in a memory pathway of the processor core that is configured to detect errors in data passing through the memory pathway.

3. The integrated circuit of claim 2, in which the error detection circuit implements a parity check.

4. The integrated circuit of claim 2, in which the error detection circuit implements an error correcting code that corrects detected errors.

5. The integrated circuit of claim 2, in which the error detection circuit checks entries in a cache of the memory pathway.

6. The integrated circuit of claim 2, in which the error detection circuit is configured to check one or more registers in the memory pathway storing status of a memory reservation.

7. The integrated circuit of claim 2, in which the error detection circuit is configured to check one or more registers storing status an interrupt identifier.

8. The integrated circuit of claim 1, in which data flow from the processor core to the checker core is limited to committed instruction packets received via a dedicated wire bundle.

9. The integrated circuit of claim 1, in which a distance between the processor core and the checker core is greater than a width of a footprint of the checker core.

10. The integrated circuit of claim 1, in which the checker core is formally verified and the processor core is not formally verified.

11. The integrated circuit of claim 1, in which the checker core is configured to commit instructions a fixed number of clock cycles after the processor core has committed the same instructions.

12. A method comprising:
   accessing, using a checker core, a committed instruction packet output from a processor core, wherein the committed instruction packet includes an instruction that has been read from an outer memory system and committed by the processor core;
   decoding, using the checker core, the instruction from the committed instruction packet;
   executing, using the checker core, the instruction to obtain one or more results;
   comparing, using the checker core, the one or more results to corresponding data of the committed instruction packet; and
   responsive to a mismatch between the one or more results and the corresponding data of the committed instruction packet, invoking a response to a detected error, in which invoking the response comprises injecting an architectural state of the checker core into the processor core.

13. The method of claim 12, in which invoking the response comprises sending an error message from the checker core to an interrupt handler to invoke an interrupt.

14. The method of claim 12, in which executing the instruction to obtain the one or more results comprises: using a portion of the committed instruction packet corresponding to data that has been read from the outer memory system by the processor core.

15. The method of claim 12, comprising:
   comparing a program counter from the committed instruction packet to the program counter of the checker core.

16. A non-transitory computer readable medium comprising a circuit representation that, when processed by a computer, is used to program or manufacture an integrated circuit comprising:
   a processor core configured to execute instructions of an instruction set;
   an outer memory system configured to store instructions and data; and
   a checker core configured to receive committed instruction packets from the processor core and check the committed instruction packets for errors, wherein the checker core is configured to utilize a memory pathway of the processor core to access the outer memory system by receiving instructions and data read from the outer memory system as portions of committed instruction packets from the processor core.

17. The non-transitory computer readable medium of claim 16, in which data flow from the processor core to the checker core is limited to committed instruction packets received via a dedicated wire bundle.

18. The non-transitory computer readable medium of claim 16, in which a distance between the processor core and the checker core is greater than a width of a footprint of the checker core.

19. The non-transitory computer readable medium of claim 16, in which the checker core is formally verified and the processor core is not formally verified.

20. The non-transitory computer readable medium of claim 16, in which the checker core is configured to commit instructions a fixed number of clock cycles after the processor core has committed the same instructions.

* * * * *